(12) United States Patent
Lee et al.

(10) Patent No.: US 12,057,567 B2
(45) Date of Patent: Aug. 6, 2024

(54) SECONDARY BATTERY ELECTRODE PLATE INCLUDING ELECTRODE MIXTURE REGIONS HAVING DIFFERENT BINDER CONTENT, AND METHOD FOR MANUFACTURING SECONDARY BATTERY ELECTRODE USING SAME

(71) Applicant: LG CHEM, LTD., Seoul (KR)

(72) Inventors: Taek Soo Lee, Daejeon (KR); Sang Hoon Choy, Daejeon (KR); Ki Tae Kim, Daejeon (KR); Cheol Woo Kim, Daejeon (KR); Young Joon Jo, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 705 days.

(21) Appl. No.: 17/285,984

(22) PCT Filed: Oct. 6, 2020

(86) PCT No.: PCT/KR2020/013552
§ 371 (c)(1),
(2) Date: Apr. 16, 2021

(87) PCT Pub. No.: WO2021/075773
PCT Pub. Date: Apr. 22, 2021

(65) Prior Publication Data
US 2021/0399278 A1    Dec. 23, 2021

(30) Foreign Application Priority Data

Oct. 15, 2019   (KR) .................. 10-2019-0127744

(51) Int. Cl.
| | | |
|---|---|---|
| *H01M 4/139* | (2010.01) | |
| *H01M 4/04* | (2006.01) | |
| *H01M 4/62* | (2006.01) | |
| H01M 10/052 | (2010.01) | |

(52) U.S. Cl.
CPC ......... *H01M 4/139* (2013.01); *H01M 4/0404* (2013.01); *H01M 4/621* (2013.01); *H01M 10/052* (2013.01)

(58) Field of Classification Search
CPC .... H01M 4/139; H01M 4/0404; H01M 4/621; H01M 10/052; H01M 10/058; H01M 4/366; H01M 10/0525; H01M 4/13; H01M 4/362; H01M 2004/021; Y02P 70/50; Y02E 60/10
See application file for complete search history.

(56) References Cited

U.S. PATENT DOCUMENTS

| | | | | |
|---|---|---|---|---|
| 5,863,336 A | * | 1/1999 | Tkaczyk ............ | H10N 60/0548 118/725 |
| 2009/0004570 A1 | * | 1/2009 | Inoue ...................... | H01M 4/70 429/246 |
| 2013/0022867 A1 | * | 1/2013 | Suzuki .................... | H01M 4/13 429/211 |
| 2014/0255768 A1 | * | 9/2014 | Jang .................... | H01M 50/561 429/211 |
| 2015/0303485 A1 | * | 10/2015 | Kim .................... | H01M 4/0404 429/234 |
| 2017/0025682 A1 | * | 1/2017 | Ji ............................. | H01M 4/70 |
| 2017/0263981 A1 | * | 9/2017 | Satou .................... | H01M 4/663 |
| 2019/0109314 A1 | * | 4/2019 | Jin ...................... | H01M 50/538 |

FOREIGN PATENT DOCUMENTS

| | | |
|---|---|---|
| CN | 110199421 A | 9/2019 |
| DE | 102017207439 A1 | 11/2018 |
| JP | 2008-084742 A | 4/2008 |
| JP | 2011-192539 A | 9/2011 |
| JP | WO2011/142083 A1 | 11/2011 |
| JP | 2013-149403 A | 8/2013 |
| JP | 2013-206743 A | 10/2013 |
| JP | 5403153 B2 | 1/2014 |
| JP | 2014-199738 A | 10/2014 |
| JP | 2016-219302 A | 12/2016 |
| JP | 2018-018678 A | 2/2018 |
| JP | 2018-060650 A | 4/2018 |
| KR | 10-2014-0106546 A | 9/2014 |
| KR | 10-2015-0083237 A | 7/2015 |
| KR | 10-2016-0013942 A | 2/2016 |
| KR | 10-2017-0075963 A | 7/2017 |
| KR | 10-2017-0095956 A | 8/2017 |
| KR | 10-2019-0007419 A | 1/2019 |

OTHER PUBLICATIONS

Extended European Search Report issued from the European Patent Office dated Mar. 10, 2022 in connection with the corresponding European Patent Application No. 20875670.0.

International Search Report dated Jan. 13, 2021 issued in corresponding International Patent Application No. PCT/KR2020/013552.

* cited by examiner

*Primary Examiner* — Muhammad S Siddiquee
(74) *Attorney, Agent, or Firm* — Morgan, Lewis & Bockius LLP (57) ABSTRACT

The present invention relates to an electrode slurry coating device and method, wherein the heights of first and second slot die heads for discharging active material can be controlled according to time to improve process efficiency and reduce defect rates when forming an active material layer having a double layer structure.

17 Claims, 2 Drawing Sheets

SECONDARY BATTERY ELECTRODE PLATE INCLUDING ELECTRODE MIXTURE REGIONS HAVING DIFFERENT BINDER CONTENT, AND METHOD FOR MANUFACTURING SECONDARY BATTERY ELECTRODE USING SAME

TECHNICAL FIELD

The present invention relates to an electrode plate for a secondary battery including an electrode mixture region having different binder contents and a method of manufacturing an electrode for a secondary battery using the same.

This application claims the benefit of priority based on Korean Patent Application No. 10-2019-0127744, filed on Oct. 15, 2019, and the entire contents of the Korean patent application are incorporated herein by reference.

BACKGROUND ART

Recent trends in the electronics industry can be summarized as wireless, mobile trends of devices and the shift from analog to digital. Representative examples include the rapid spread of mobile devices and notebook computers, as well as the shift from analog cameras to digital cameras.

In addition to these trends, research and development on secondary batteries as an operating power source for devices have been actively conducted. Among them, lithium secondary batteries having high output and capacity to weight, which use lithium transition metal oxides or lithium composite oxides, etc. as positive electrode active materials, have been widely spotlighted. The lithium secondary battery has a structure in which an electrode assembly of positive electrode/separator/negative electrode is embedded in a sealed container with an electrolyte.

On the other hand, the electrode generates a current through the exchange of ions, and the positive electrode and negative electrode constituting the electrode has a structure in which the electrode active material is applied to the electrode current collector made of metal.

In general, the negative electrode has a structure in which a carbon-based active material is coated on an electrode plate made of copper or aluminum, and the positive electrode has a structure in which an active material made of $LiCoO_2$, $LiMnO_2$, $LiNiO_2$, or the like is coated on an electrode plate made of aluminum, etc.

In order to manufacture a positive electrode or a negative electrode, an electrode mixture including an electrode active material is coated on an electrode current collector made of a long metal sheet in one direction at regular intervals and is then processed into a set electrode shape.

In the first step of this shape processing, the electrode current collector consisting of a long metal sheet in one direction coated with the electrode mixture is cut through a cutting process of slitting or notching to thereby be processed into two or more electrode strip shapes.

However, in the prior art, during the process of manufacturing such an electrode, during the transfer of the electrode current collector made of a long metal sheet in one direction, to which the electrode mixture is applied, to the slitting device, as a difference in the stretching force between the current collector and the coating layer occurs due to the force of the transfer roller or the tension applied during the roll-to-roll process, the bonding force of the bonding surface between the current collector and the coating layer may decrease. In addition, as the force of shearing the electrode current collector by the cutter of the slitting device is transmitted, the adhesive force between the particles (active material, conductive material, and binder) constituting the electrode coating layer decreases, and the electrode layer in which single particles or multiple particles are collected is pulverized and debris of the coating layer is generated. Such debris itself becomes a foreign substance and may cause problems, and problems may occur in the coating layer where part thereof becomes defective due to the debris.

Particularly, breakage occurs more frequently at the boundary between the region where the electrode mixture is applied and the uncoated region on the electrode current collector, which has become a major cause of increasing product defect rates.

Therefore, a technology capable of reducing defects due to damage or the like in a process of processing an electrode current collector of a secondary battery into a specific electrode shape is very necessary.

DISCLOSURE

Technical Problem

The present invention was devised to solve the above problems, and an object of the present invention is to provide an electrode plate including active material regions having different binder contents and a method of manufacturing an electrode using the same.

Technical Solution

An electrode plate for a secondary battery according to the present invention includes: a current collector layer; and a mixture layer for an electrode, formed on one or both sides of the current collector layer. Specifically, the mixture layer includes a high binder-containing region with a high binder content and a low binder-containing region with a low binder content, the mixture layer has a structure in which a first high binder-containing region, a first low binder-containing region, a k-th high binder-containing region, a k-th low binder-containing region, and an n-th high binder-containing region are sequentially formed in a direction of from one edge of the mixture layer to the other edge of the mixture layer, based on a cross section of a width direction (TD), and k is an integer between 2 and n−1, and n is an integer between 3 and 10.

In one example, a deviation between binder contents of the high binder-containing region and the low binder-containing region is 20% by weight or more.

In a specific example, a ratio of binder contents of the high binder-containing region and the low binder-containing region is in a range of 1.2:1 to 30:1.

In further another example, in the high binder-containing region, a deviation between a binder content ($B_L$) at height 20% point and a binder content ($B_H$) at a height 80% point on a basis of a thickness of the mixture layer, is 15% by weight or less.

In another example, the ratio ($L_{BH}$:$L_{BL}$) of the width of the high binder-containing region ($L_{BH}$) and the width of the low binder-containing region ($L_{BL}$) is in the range of 1:3 to 1:600.

In one example, both edges of the current collector include a non-coated part in which no mixture layer is formed, based on the cross section in the width direction (TD).

In a specific example, the high binder-containing region is a region in which cutting is performed in an electrode slitting process.

In addition, the present invention provides a method of manufacturing an electrode using the electrode plate for a secondary battery described above.

In one example, the method of manufacturing an electrode for a secondary battery according to the present invention includes: a step of forming a mixture layer for an electrode on one surface or both surfaces of a current collector layer; and a step of slitting the current collector layer on which the mixture layer is formed. Specifically, the step of forming the mixture layer includes forming the mixture layer to include a high binder-containing region formed by discharging a slurry for electrode mixture with a high binder content, and a low binder-containing region formed by discharging a slurry for electrode mixture with a low binder content, a first high binder-containing region, a first low binder-containing region, a k-th high binder-containing region, a k-th low binder-containing region, and an n-th high binder-containing region are sequentially formed in a direction of from one edge of the mixture layer to the other edge of the mixture layer, based on a cross section of a width direction (TD), and k is an integer between 2 and n−1, and n is an integer between 3 and 10.

In one example, in the step of forming the mixture layer, a deviation between binder contents of the high binder-containing region and the low binder-containing region is 20% by weight or more.

In further another example, the step of forming the mixture layer is performed by stripe coating using a double slit coating apparatus, a first slit discharges a first slurry in a patterned form on the current collector layer, and a second slit discharges a second slurry in a form that fills gaps between the first slurry patterns discharged on the current collector layer.

In a specific example, the first slurry discharged through the first slit is a slurry containing a high binder content, and the second slurry discharged through the second slit is a slurry containing a low binder content.

In further another example, the method of manufacturing an electrode for a secondary battery according to the present invention includes a step of forming a lower mixture layer by discharging a slurry having a high binder content on the current collector, before the step of forming the mixture layer. Specifically, the step of forming the mixture layer is performed by a process of forming an upper mixture layer on the formed lower mixture layer.

In a specific example, a deviation between a binder content of the lower mixture layer and a binder content of the high binder-containing region of the upper mixture layer is 15% by weight or less. In addition, in the upper mixture layer, the deviation of the binder content between the high binder-containing region and the low binder-containing region is 20% by weight or more.

In one example, a thickness ratio of the lower mixture layer and the upper mixture layer is in a range of 1:1.5 to 1:20.

Advantageous Effects

According to an electrode plate for a secondary battery and an electrode manufacturing method using the same according to the present invention, in the electrode, it is possible to solve the problem of breakage occurring at a portion where the electrode mixture is applied or the boundary of a portion where the electrode mixture is applied and the non-coated part to which the electrode mixture is not applied, and improve process efficiency.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In the present invention, the electrode plate for a secondary battery refers to a structure in which an electrode mixture including an active material is applied to an electrode current collector made of a metal sheet long in one direction.

In the present invention, the mixture refers to a mixture applied as an electrode for a secondary battery, for example, a composition in which an active material, a binder, a conductive agent and other ingredients are mixed, and each of these elements will be described later.

The present invention provides an electrode plate for a battery, including: a current collector layer; and an electrode mixture layer formed on one or both sides of the current collector layer. In one embodiment, the mixture layer includes a high binder-containing region with a high binder content and a low binder-containing region with a low binder content, and the mixture layer has a structure in which a first high binder-containing region, a first low binder-containing region, a k-th high binder-containing region, a k-th low binder-containing region, and an n-th high binder-containing region are sequentially formed in a direction of from one edge of the active material layer to the other edge of the mixture layer, based on a cross section of a width direction (TD). Here, k is an integer between 2 and n−1, and n is an integer between 3 and 10. For example, n may range from 3 to 8 or 3 to 5.

The electrode plate for a secondary battery is processed in the form of two or more electrode strips through slitting (lengthwise slitting) in a subsequent slitting process. In the electrode plate for a secondary battery according to the present invention, a high binder-containing region with a high binder content and a low binder-containing region with a low binder content are alternately formed based on a cross section in the width direction (TD), and both ends have a structure in which a high binder-containing region is formed.

In addition, in the electrode plate for a secondary battery according to the present invention, a region containing a high binder corresponds to a position where slitting is performed. In the present invention, by forming a region containing a high binder in a region for slitting the electrode plate, there is an effect of preventing breakage or separation of the mixture layer, or spreading between the mixture layer and the current collector layer, which may occur during the slitting process.

In one embodiment, the deviation of the binder content between the high-binder-containing region and the low-binder-containing region is 20% by weight or more. Specifically, the deviation of the binder content between the high binder-containing region and the low binder-containing region is in the range of 20 to 500% by weight, 20 to 400% by weight, 20 to 300% by weight, 100 to 500% by weight, 200 to 500% by weight, 300 to 500% by weight, 20 to 150% by weight, 30 to 100% by weight or 50 to 90% by weight. The deviation of the binder content is a value obtained by converting the difference between the content of the binder contained in the high binder region and the content of the binder contained in the low binder region, into a percentage, compared to the binder content contained in the low binder region.

In one embodiment, the ratio of the binder content of the high binder-containing region and the low binder-containing region is in the range of 1.2:1 to 30:1. Specifically, the ratio of the binder content of the high binder-containing region and the low binder-containing region is in the range of 1.2:1 to 20:1, 1.2:1 to 10:1, 1.2:1 to 50:1, 1.5:1 to 10:1, or 1.5:1 to 3:1. The high binder-containing region is a region containing a binder having a high content, compared to the content of the active material. When the content of the binder is increased, the internal bonding force of the mixture layer is improved, and the interfacial bonding force with the current collector layer is increased. However, if the content of the binder is too high, the capacity of the battery decreases due to the decrease in the content of the active material, and there is a limit in that the electrical resistance increases.

In another embodiment, the high binder-containing region, based on the thickness of the mixture layer, the deviation between the binder content ($B_L$) at the height 20% point and the binder content ($B_H$) at the height 80% point is 15% by weight or less. Specifically, in the high binder-containing region, the deviation between the binder content ($B_L$) at the height 20% point and the binder content ($B_H$) at the height 80% point is in the range of 0.01 to 15% by weight, 0.01 to 10% by weight, 0.01 to 5% by weight, 0.01 to 3% by weight, 0.1 to 3% by weight, or 0.01 to 1% by weight. The content of the binder in the high binder-containing region of the present invention is substantially equivalent. However, during the process of manufacturing the electrode, for example, drying the electrode, the content of the binder may partially vary depending on the height.

In another example, the ratio ($L_{BH}:L_{BL}$) of the width of the high binder-containing region ($L_{BH}$) and the width of the low binder-containing region ($L_{BL}$) is in the range of 1:3 to 1:600. Specifically, the ratio ($L_{BH}:L_{BL}$) of the width of the high binder-containing region ($L_{BH}$) and the low binder-containing region ($L_{BL}$) is in the range of 1:3 to 1:500, 1:3 to 1:300, 1:50 to 1:600, 1:50 to 1:400, or 1:80 to 1:200. It is advantageous in terms of battery characteristics to form the width $L_{BL}$ of the low binder-containing region as wide as possible. However, by appropriately adjusting the width $L_{BH}$ of the high binder-containing region, damage to the electrode may be prevented in the process of forming the electrode plate, and separation of the mixture may be minimized.

For example, the electrode plate includes an non-coated part in which a mixture layer is not formed at both edges of the current collector based on a cross section in the width direction (TD). The non-coated part becomes a region for forming an electrode tab. For example, one or more non-coated parts may be additionally formed at a portion between regions in which the mixture layer is formed, as well as both edges in the width direction of the electrode plate.

In addition, the present invention provides a method of manufacturing an electrode using the electrode plate described above.

In one embodiment, the electrode manufacturing method according to the present invention includes the steps of forming an electrode mixture layer on one or both surfaces of the current collector layer; and slitting the current collector layer on which the mixture layer is formed. At this time, the "slitting step" includes not only cutting the current collector layer linearly with a cutter, but also notching of punching by a mold, and it means a step of cutting the electrode in the electrode processing process. Specifically, the step of forming the mixture layer includes forming the mixture layer to include a high binder-containing region formed by discharging a slurry for electrode mixture with a high binder content, and a low binder-containing region formed by discharging a slurry for electrode mixture with a low binder content, a first high binder-containing region, a first low binder-containing region, a k-th high binder-containing region, a k-th low binder-containing region, and an n-th high binder-containing region are sequentially formed in a direction of from one edge of the mixture layer to the other edge of the mixture layer, based on a cross section of a width direction (TD), and k is an integer between 2 and n−1, and n is an integer between 3 and 10.

The electrode manufacturing method according to the present invention is performed by discharging slurries for mixtures having different binder contents onto the current collector layer through stripe coating. In this case, in the step of forming the mixture layer, a deviation of the binder content between the high binder-containing region and the low binder-containing region is 20% by weight or more. Specifically, the deviation of the binder content between the high binder-containing region and the low binder-containing region is in the range of 20 to 500% by weight, 20 to 400% by weight, 20 to 300% by weight, 100 to 500% by weight, 200 to 500% by weight, 300 to 500% by weight, 20 to 150% by weight, 30 to 100% by weight or 50 to 90% by weight. The deviation of the binder content is a value obtained by converting the difference between the content of the binder contained in the high binder region and the content of the binder contained in the low binder region, into a percentage, compared to the binder content contained in the low binder region.

In another embodiment, the step of forming the mixture layer is performed by stripe coating using a double slit coating apparatus. For example, the double slit has a structure in which first and second slits are sequentially formed, the first slit discharges the first slurry in a patterned form on the current collector layer, and the second slit discharges the second slurry in a form of filling the gap between the first slurry patterns discharged on the current collector layer.

In a specific example, the first slurry discharged through the first slit is a slurry containing a high binder content, and the second slurry discharged through the second slit is a slurry containing a low binder content. This is to discharge the slurry containing the high binder first to form a pattern, and discharge the slurry containing the low binder to fill the gaps between the formed patterns. In the present invention, the order of discharging the first and second slurries is not particularly limited, but by discharging the slurry containing the high binder first, there is an effect of increasing the bonding force with the current collector layer and fixing the discharging position in the process.

In one embodiment, the electrode manufacturing method according to the present invention may include forming a lower mixture layer by discharging a slurry having a high binder content on the current collector before the step of forming the mixture layer. Specifically, the step of forming the mixture layer may be performed by forming an upper mixture layer on the formed lower mixture layer.

For example, the deviation between the binder content of the lower mixture layer and the binder content of the high binder-containing region of the upper mixture layer is 15% by weight or less. In addition, in the upper mixture layer, the deviation of the binder content between the high binder-containing region and the low binder-containing region is 20% by weight or more. Numerical value or deviation ranges according to the content of each binder are omitted because the ranges overlap with those described above.

In another embodiment, the thickness ratio of the lower mixture layer and the upper mixture layer is in the range of 1:1.5 to 1:20. Specifically, the thickness ratio of the lower mixture layer and the upper mixture layer is in the range of 1:2.5 to 1:15, 1:5 to 1:20, 1:5 to 1:10, 1:1.5 to 1:5, or 1:15 to 1:20. The thickness ratio is selected in consideration of the capacity of the electrode and the bonding force between the current collector layer and the mixture layer.

The electrode plate for a secondary battery according to the present invention may be a positive electrode or a negative electrode. The electrode plate or electrode according to the present invention can be applied to a secondary battery, specifically, a lithium secondary battery. The secondary battery has a structure of including an electrode assembly including a positive electrode, a negative electrode, and a separator interposed between the positive electrode and the negative electrode; an non-aqueous electrolyte solution impregnating the electrode assembly; and a battery case containing the electrode assembly and the non-aqueous electrolyte solution. The non-aqueous electrolyte solution is, for example, an electrolyte solution containing a lithium salt. Hereinafter, specific components of each electrode will be described, but the scope of the present invention is not limited thereto.

The positive electrode has a structure in which a positive electrode mixture layer is stacked on one or both sides of a positive electrode current collector. In one example, the positive electrode mixture layer includes a positive electrode active material, a conductive material and a binder polymer, etc. and if necessary, may further include a positive electrode additive commonly used in the art.

The positive electrode active material may be a lithium-containing oxide, and may be the same or different. A lithium-containing transition metal oxide may be used as the lithium-containing oxide.

For example, the lithium-containing transition metal oxide may be any one or a mixture of two or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O ≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), and the lithium-containing transition metal oxide may be coated with a metal or metal oxide such as aluminum (Al). Further, in addition to the lithium-containing transition metal oxide, one or more of sulfide, selenide, and halide may be used.

The positive electrode active material may be included in the range of 94.0 to 98.5 wt % in the positive electrode mixture layer. When the content of the positive electrode active material satisfies the above range, it is advantageous in terms of manufacturing a high-capacity battery and providing sufficient conductivity of the positive electrode or adhesion between electrode materials.

The current collector used for the positive electrode is a metal having high conductivity, and any metal which the positive electrode mixture slurry may be easily attached to and which is not reactive in the voltage range of the electrochemical device can be used. Specifically, non-limiting examples of the current collector for the positive electrode include aluminum, nickel, or a foil manufactured by a combination thereof.

The positive electrode mixture layer further includes a conductive material. The conductive material is usually added in an amount of 1 to 30% by weight based on the total weight of the mixture layer including the positive electrode active material. Such a conductive material is not particularly limited as long as it has conductivity without causing a chemical change in the secondary battery. For example, graphite such as natural graphite or artificial graphite; carbon black such as carbon black, acetylene black, ketjen black, channel black, furnace black, lamp black, or thermal black; conductive fiber such as carbon fiber or metal fiber; metal powder such as carbon fluoride, aluminum, or nickel powder; conductive whiskey such as zinc oxide or potassium titanate; conductive metal oxide such as titanium oxide; and polyphenylene derivative may be used as the conductive material.

As the binder component, a binder polymer commonly used in the art may be used without limitation. For example, various kinds of binders such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), and carboxyl methyl cellulose (CMC) may be used.

The content of the binder polymer is proportional to the content of the conductive material included in the upper positive electrode active material layer and the lower positive electrode active material layer. This is to impart adhesion to conductive materials whose particle size is relatively small compared to the active material and is because when the content of the conductive material increases, more binder polymer is required, and when the content of the conductive material decreases, less binder polymer can be used.

Further, the negative electrode has a structure in which a negative electrode mixture layer is stacked on one or both sides of a negative electrode current collector. In one example, the negative electrode mixture layer includes a negative electrode active material, a conductive material, and a binder polymer, and if necessary, may further include a negative electrode additive commonly used in the art.

The negative electrode active material may include a carbon material, lithium metal, silicon or tin. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials.

In addition, the negative electrode may include a conductive material and a binder commonly used in the art.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, or polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, etc. may be used individually or as a polymer by a mixture thereof, to thereby form the non-woven fabric, in addition to polyolefin-based nonwoven fabric. The structure of the nonwoven fabric may be a spunbond nonwoven fabric composed of long fibers or a melt blown nonwoven fabric.

The thickness of the porous substrate is not particularly limited, but may be 5 to 50 μm, and the pore size and porosity present in the porous substrate are also not particularly limited, but may be 0.01 to 50 μm and 10 to 95%, respectively.

Meanwhile, in order to improve mechanical strength of the separator composed of the porous substrate and to suppress a short circuit between the positive electrode and the negative electrode, a porous coating layer including inorganic particles and a binder polymer may be further included on at least one surface of the porous substrate.

The electrolyte may contain an organic solvent and an electrolyte salt, and the electrolyte salt is a lithium salt. Those conventionally used in the electrolyte for lithium secondary batteries may be used as the lithium salt without limitation. For example, one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $CF_3(CF_2)_7SO_3^-$, $CF_3CO_2^-$, $CH_3CO_2^-$, $SCN^-$ and $(CF_3CF_2SO_2)_2N^-$ may be included as the anion of the lithium salt.

As the organic solvent included in the electrolyte described above, those conventionally used in electrolytes for lithium secondary batteries may be used without limitation, and for example, ethers, esters, amides, linear carbonates, and cyclic carbonates may be used alone or in combination of two or more. Among them, representatively, a cyclic carbonate, a linear carbonate, or a carbonate compound that is a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and a halide thereof, and a mixture thereof. These halides include, for example, fluoroethylene carbonate (FEC), but are not limited thereto.

In addition, specific examples of the linear carbonate compound include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more of them may be typically used, but is not limited thereto.

In particular, among the carbonate-based organic solvents, ethylene carbonate and propylene carbonate, which are cyclic carbonates, are organic solvents of high viscosity and have high dielectric constants, so that lithium salts in the electrolyte can be more easily dissociated, and if the cyclic carbonate is mixed with a low viscosity, low dielectric constant linear carbonate such as dimethyl carbonate and diethyl carbonate in an appropriate ratio, an electrolyte solution having a higher electrical conductivity can be prepared.

In addition, as the ether of the organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

And esters among the organic solvents include any one selected from the group consisting of methyl acetate, ethyl acetate, propyl acetate, methyl propionate, ethyl propionate, propyl propionate, γ-butyrolactone, γ-valerolactone, and γ-caprolactone, or a mixture of two or more of them, but the present invention is not limited thereto.

The injection of the non-aqueous electrolyte may be performed at an appropriate step in the manufacturing process of the electrochemical device, depending on the manufacturing process and required physical properties of the final product. That is, it can be applied before assembling the electrochemical device or at the final stage of assembling the electrochemical device.

Hereinafter, the present invention will be described in more detail through drawings and examples.

Preparation Example 1: Preparation of a Mixture Having a High Binder Content (First Mixture)

100 parts by weight of NCM ($LiNi_{0.8}Co_{0.1}Mn_{0.1}O_2$) as a positive electrode active material, 1.5 parts by weight of carbon black (FX35, Denka, average diameter (D50) 15 to 40 nm) as a conductive material, and 3.5 parts by weight of polyvinylidene fluoride (KF9700, Kureha) as a binder polymer were added to NMP (N-methyl-2-pyrrolidone) as a solvent to prepare a first mixture slurry.

Preparation Example 2: Preparation of a Mixture with a Low Binder Content (Second Mixture)

100 parts by weight of NCM ($LiNi_{0.8}Co_{0.1}Mn_{0.1}O_2$) as a positive electrode active material, 0.1 parts by weight of carbon black (FX35, Denka, average diameter (D50) 15 to 40 nm) as a conductive material, and 2 parts by weight of KF9700 (Kureha) as a binder polymer were added to NMP (N-methyl-2-pyrrolidone) as a solvent to prepare a second mixture slurry.

Example 1: Preparation of Electrode Plate for Secondary Battery

The first and second mixture slurries were stripe-coated on the current collector layer formed of aluminum foil using a double slit coating apparatus. Specifically, in the double slit coating apparatus, the first mixture slurry was stripe-coated through the first slit so that three lines are formed on the current collector layer at a loading amount of 600 mg/25 cm², and subsequently, the second mixture slurry was discharged at the same loading amount through the second slit so as to fill gaps between the discharged first mixture slurry lines. In the double slit coating apparatus, the number and width of lines of the discharge are controlled by the shape of the core disposed at the discharge port. The ratio of the width of the discharged first mixture slurry and the width of the second mixture slurry is 1:10. Thereafter, the thickness of the positive electrode mixture layer after vacuum drying is an average of 100 µm.

Figure 1:
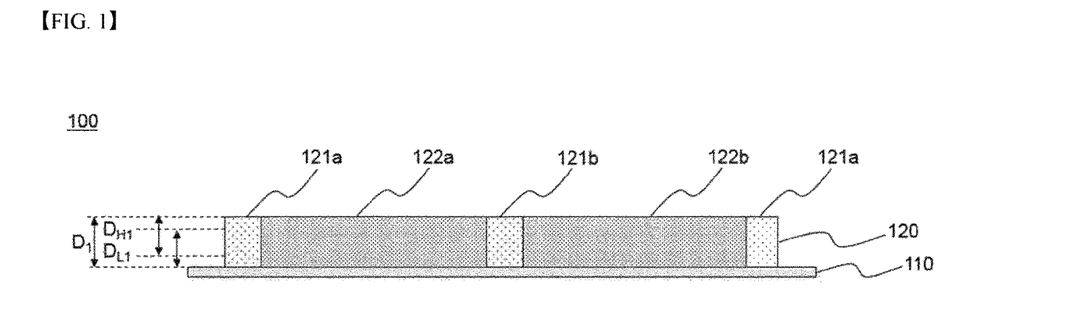
FIGS. 1 and 2 are schematic diagrams each showing a cross-sectional structure of an electrode plate for a battery according to an embodiment of the present invention.

The cross-sectional structure of the manufactured electrode plate is as shown in FIG. 1. FIG. 1 is a schematic diagram showing a cross section in the width direction (MD) of the manufactured electrode plate 100. Referring to FIG. 1, the electrode plate 100 manufactured according to the above embodiment includes has a structure in which a mixture layer 120, divided into regions 121a and 121b having a high binder content and regions 122a and 122b having a low binder content on the current collector layer 110 formed of aluminum foil, is formed. The average thickness ($D_1$) of the mixture layer 120 was measured to be 100 µm.

In the electrode plate 100, the regions 121a and 121b having a high binder content are formed at both edges 121a and center 121b of the mixture layer 120, and the regions 122a and 122b having a low binder content have a structure of filling gaps between the regions 121a and 121b having a high binder content.

Further, the difference in the binder contents measured at the height 20% point ($D_{L1}$) and the height 80% point ($D_{H1}$) is 12% by weight or less, in the regions 121a and 121b with a high binder content, on the basis of the mixture layer 120 of the electrode plate 100, and the actual difference was at the level of 1% by weight. This means that the binder content of the regions 121a and 121b having a high binder content is uniform as a whole.

Example 2: Preparation of Electrode Plate for Secondary Battery

An electrode plate for a secondary battery was manufactured in the same manner as in Example 1, except that the ratio of the width of the discharged first mixture slurry and the width of the second mixture slurry was at a level of 1:500.

Example 3: Preparation of Electrode Plate for Secondary Battery

An electrode plate for a secondary battery was manufactured in the same manner as in Example 1, except that the first mixture slurry was discharged so that five lines were formed through the first slit in the double slit coating apparatus.

Example 4: Preparation of Electrode Plate for Secondary Battery

The first mixture slurry was coated on an aluminum foil in a loading amount of 60 mg/25 cm² to form a lower mixture layer. An upper mixture layer was formed on the formed lower mixture layer.

With respect to the mixture layer, in the double slit coating apparatus, the first mixture slurry was stripe-coated through the first slit so that three lines are formed on the current collector layer at a loading amount of 540 mg/25 cm², and subsequently, the second mixture slurry was discharged at the same loading amount through the second slit so as to fill gaps between the discharged first mixture slurry lines. The ratio of the width of the discharged first mixture slurry and the width of the second mixture slurry is 1:10.

The thickness of the positive electrode mixture layer after vacuum drying is an average of 100 µm.

Figure 2:
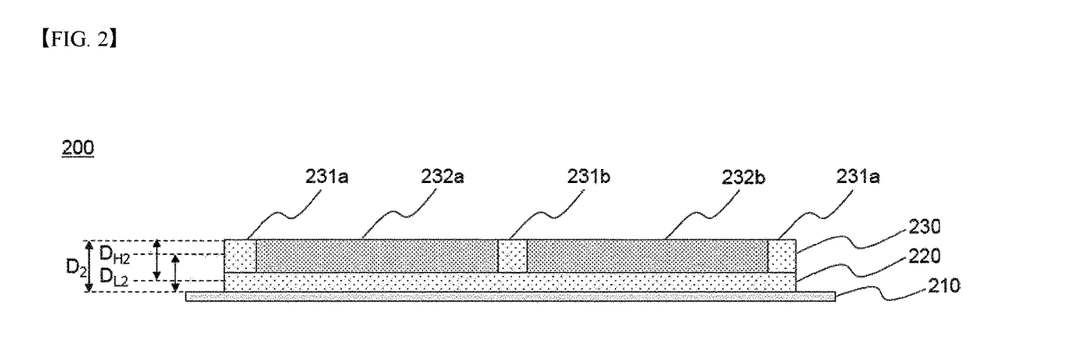

The cross-sectional structure of the manufactured electrode plate is as shown in FIG. 2. FIG. 2 is a schematic diagram showing a cross section in the width direction (MD) of the manufactured electrode plate 200. Referring to FIG. 2, the electrode plate 200 manufactured according to the above embodiment has a structure in which a lower mixture layer 220 and an upper mixture layer 230 are sequentially formed on a current collector layer 210 formed of aluminum foil. In addition, the upper mixture layer 230 has a structure divided into regions 231a and 231b having a high binder content and regions 232a and 232b having a low binder content. The average thickness ($D_2$) of the mixture layer 220 was measured to be 100 µm.

Further, the difference in the binder contents measured at the height 20% point ($D_{L2}$) and the height 80% point ($D_{H2}$) is 12% by weight or less, in the regions 231a and 231b with a high binder content, on the basis of the entire mixture layer of the electrode plate 200, and the actual difference was at the level of 1% by weight. This result means that the binder content of the regions 231a and 231b having a high binder content is uniform as a whole.

Example 5

An electrode plate for a secondary battery was manufactured in the same manner as in Example 3, except for the fact that carbon nanotubes (LUCAN-BT1001M, LG Chem, aspect ratio 100-300) were used as the conductive material when preparing the mixture slurry forming the lower mixture layer.

Comparative Example: Preparation of an Electrode Plate for a Secondary Battery

An electrode plate for a secondary battery was manufactured in the same manner as in Example 1, except that the mixture layer was formed by discharging only the second mixture slurry.

Experimental Example: Performing Slitting on an Electrode Plate

For each of the specimens prepared in Examples 1 and 2 and Comparative Examples, slitting was performed to determine whether there was a defect. For the specimens of Examples 1 and 2, slitting was performed along the region to which the first mixture slurry was applied. For the specimens of the comparative example, slitting was performed at positions corresponding to the slitting positions of Examples 1 and 2, respectively.

Figure 3:
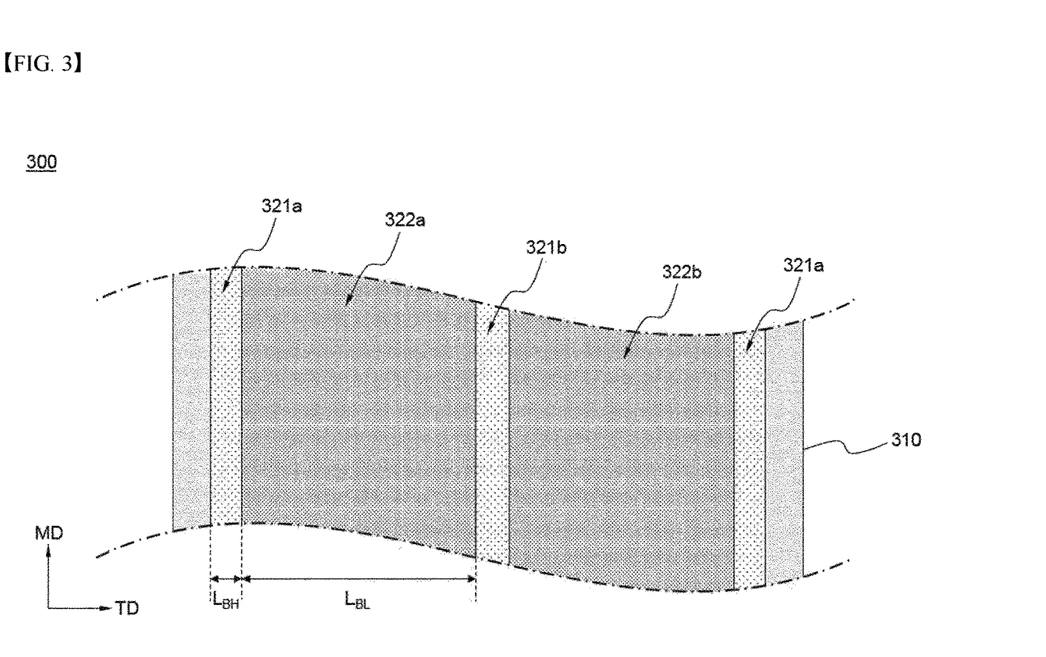
FIG. 3 is a plan view showing an electrode plate for a battery according to an embodiment of the present invention.

FIG. 3 is a front view of the electrode plate according to the present embodiment, showing the electrode plate before the slitting process is performed. Referring to FIG. 3, the electrode plate 300 has a form having a mixture layer of a structure in which regions 321a and 321b with a high binder content and regions 322a and 322b with a low binder content are alternately repeated in the width direction MD on the current collector layer 310. Both edges of the current collector layer 310 in the width direction MD are non-coated parts in which the mixture layer is not formed. In addition, based on the width direction (MD), the ratio of the width ($L_{BH}$) of the regions 321*a* and 321*b* with a high binder content and the width ($L_{BL}$) of the regions 322*a* and 322*b* with a low binder content is 1:10 in Example 1 and is 1:500 in Example 2. Slitting is performed in the longitudinal direction along regions 321*a* and 321*b* having a high binder content in the electrode plate 300.

Slitting was performed on each of 10 specimens, and defects were determined through visual observation. As a result, it was confirmed that all specimens were normal in the case of Examples 1 and 2. However, in the case of the comparative example, a total of 3 specimens were determined to be defective, and specifically, it was confirmed that some breakage of the mixture layer was observed in two specimens, and that the interface between the current collector layer and the mixture layer was widened in one specimen.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

100, 200, 300: electrode plate
110, 210, 310: current collector layer
120: mixture layer
121*a*, 121*b*, 231*a*, 231*b*, 321*a*, 321*b*: region with a high binder content
122*a*, 122*b*, 232*a*, 232*b*, 322*a*, 322*b*: region with a low binder content
220: lower mixture layer
230: upper mixture layer

The invention claimed is:

1. An electrode plate for a secondary battery, comprising:
a current collector layer;
a lower mixture layer including a binder disposed on one or both sides of the current collector layer; and
an upper mixture layer including the binder disposed on one or both sides of the the lower mixture layer,
wherein the upper mixture layer includes n of high binder-containing regions and (n−1) of low binder-containing regions, wherein the high binder-containing regions include the binder in an amount (wt %) higher than an amount (wt %) of the binder included in the low binder-containing regions,
wherein the upper mixture layer has a structure in which the high binder-containing region and the low binder-containing region are alternatively disposed on the current collector where each of the low binder-containing regions is disposed in between each pair of the high binder-containing regions in a direction of from one edge of the upper mixture layer to the other edge of the mixture layer, based on a cross section of a width direction (TD),
wherein, n is an integer between 3 and 10, and
wherein the high binder-containing regions are regions including one or more cuttings.

2. The electrode plate of claim 1, wherein a difference between binder contents of the high binder-containing region and the low binder-containing region is 20% by weight or more.

3. The electrode plate of claim 1, wherein a weight ratio of a binder content of the high binder-containing region to a binder content of the low binder-containing region is in a range of 1.2:1 to 30:1.

4. The electrode plate of claim 1, wherein, in the high binder-containing region, a difference between a binder content (BL) at height 20% point and a binder content (BH) at a height 80% point on a basis of a thickness of the mixture layer, is 15% by weight or less.

5. The electrode plate of claim 1, wherein a ratio ($L_{BH}$:$L_{BL}$) of a width of the high binder-containing region ($L_{BH}$) to a width of the low binder-containing region ($L_{BL}$) is in a range of 1:3 to 1:600.

6. The electrode plate of claim 1, wherein both edges of the current collector include a non-coated part in which no mixture layer is disposed, based on the cross section in the width direction (TD).

7. A method for manufacturing an electrode for a secondary battery, comprising:
forming a lower mixture layer including a binder on one surface or both surfaces of a current collector layer;
forming an upper mixture layer including the binder on one surface of both surfaces of the lower mixture layer; and
slitting the current collector layer on which the upper mixture layer is formed,
wherein the forming the upper mixture layer includes forming n of a high binder-containing region by discharging a slurry for the high binder-containing region, and (n−1) of a low binder-containing region by discharging a slurry for the low binder-containing region,
wherein the slurry for the high binder-containing region includes the binder in an amount (wt %) higher than an amount (wt %) of the binder included in the slurry for the low binder-containing region,
wherein the high binder-containing region and the low binder-containing region are alternatively formed on the lower mixture layer where each of the low binder-containing regions is disposed in between each pair of the high binder-containing regions in a direction of from one edge of the upper mixture layer to the other edge of the upper mixture layer, based on a cross section of a width direction (TD), and
wherein n is an integer between 3 and 10.

8. The method of claim 7, wherein, in the forming the mixture layer, a difference between binder contents of the high binder-containing region and the low binder-containing region is 20% by weight or more.

9. The method of claim 7, wherein the forming the upper mixture layer is performed by stripe coating using a double slit coating apparatus,
wherein a first slit discharges a first slurry in a patterned form on the current collector layer, and
wherein a second slit discharges a second slurry in a form that fills gaps between the first slurry patterns discharged on the current collector layer.

10. The method of claim 9, wherein the first slurry discharged through the first slit is a high binder-containing slurry having a high binder content, and
wherein the second slurry discharged through the second slit is a low binder-containing slurry having a low binder content.

11. The method of claim 7, wherein the lower mixture layer is formed by discharging the slurry for the high binder content on the current collector, before the forming the mixture layer.

12. The method of claim 11, wherein a difference between a binder content of the lower mixture layer and a binder content of the high binder-containing region of the upper mixture layer is 15% by weight or less, and wherein, in the upper mixture layer, the deviation between binder contents of the high binder-containing region and the low binder-containing region is 20% by weight or more.

13. The method of claim 11, wherein a thickness ratio of the lower mixture layer and the upper mixture layer is in a range of 1:1.5 to 1:20.

14. The electrode plate of claim 1, wherein the upper mixture layer is not disposed to contact with a side surface of the lower mixture layer.

15. The electrode plate of claim 1, wherein the upper mixture layer is not directly disposed to on the current collector.

16. The method of claim 7, wherein the upper mixture layer is not disposed to contact with a side surface of the lower mixture layer.

17. The method of claim 7, wherein the upper mixture layer is not directly disposed to on the current collector.

\* \* \* \* \*